United States Patent [19]

Horimai et al.

[11] Patent Number: 4,964,110

[45] Date of Patent: Oct. 16, 1990

[54] APPARATUS FOR REPRODUCING A MAGNETO-OPTICAL DISK USING A SHOT NOISE REDUCTION CIRCUIT

[75] Inventors: Hideyoshi Horimai, Miyagi; Hiroshi Ogawa, Kanagawa, both of Japan

[73] Assignee: Sony Corporation, Tokyo, Japan

[21] Appl. No.: 189,710

[22] Filed: May 3, 1988

[30] Foreign Application Priority Data

May 28, 1987 [JP] Japan .................... 62-132392

[51] Int. Cl.$^5$ .............................................. G11B 7/00
[52] U.S. Cl. .................................. 369/110; 369/13; 369/124
[58] Field of Search ................. 369/13, 46, 106, 107, 369/110, 124, 44.29, 44.32, 44.35, 44.36; 360/59, 114; 365/122; 350/378; 250/201 DF, 201 AF, 570, 201.1, 201.5

[56] References Cited

U.S. PATENT DOCUMENTS

| | | | |
|---|---|---|---|
| 4,691,308 | 9/1987 | Takagi et al. | 369/13 |
| 4,734,903 | 3/1988 | Shirai et al. | 369/124 X |
| 4,774,615 | 9/1988 | Revelli et al. | 365/122 X |
| 4,847,824 | 7/1989 | Davie | 369/13 X |
| 4,858,212 | 8/1989 | Takahashi et al. | 369/13 |

OTHER PUBLICATIONS

Patent Abstracts of Japan, vol. 12, No. 451, p. 791, 11/28/88, & JP 63-173252.
Patent Abstracts of Japan, vol. 5, No. 69, p. 060, 5/9/81 & JP 56-19176.

*Primary Examiner*—Robert L. Richardson
*Assistant Examiner*—W. R. Young
*Attorney, Agent, or Firm*—Lewis H. Eslinger; Jay H. Maioli

[57] ABSTRACT

An apparatus for reproducing a magneto-optical disk which is adapted to intermittently irradiate a magneto-optical disk with a light beam emitted from a laser light source at a predetermined sampling period, detect a polarized component of the light beam emitted from the laser light source and reflected from the disk by detecting elements, derive the reproduced output of an information signal recorded on the magneto-optical disk by taking the difference between the detected outputs from the respective detecting elements, and in which there is provided a random noise removing circuit at the rear stage of the detecting elements for removing photoelectric converting noises generated in the detecting elements.

7 Claims, 6 Drawing Sheets

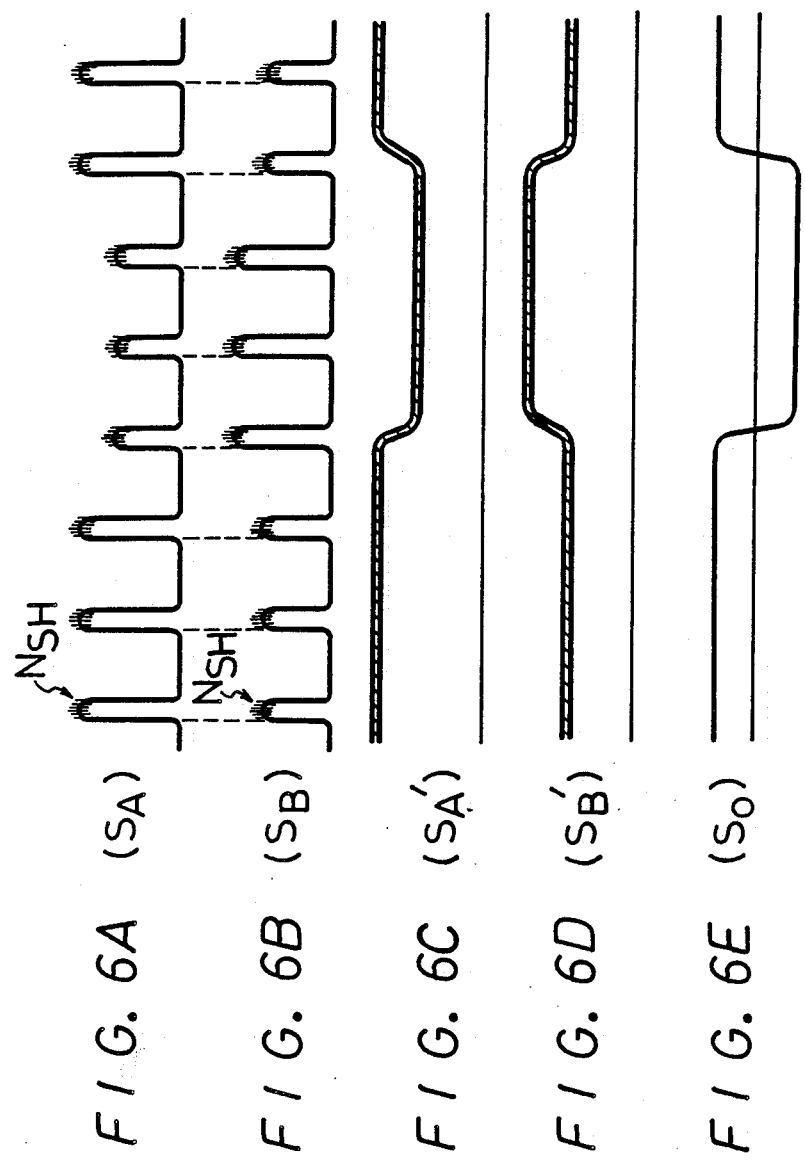

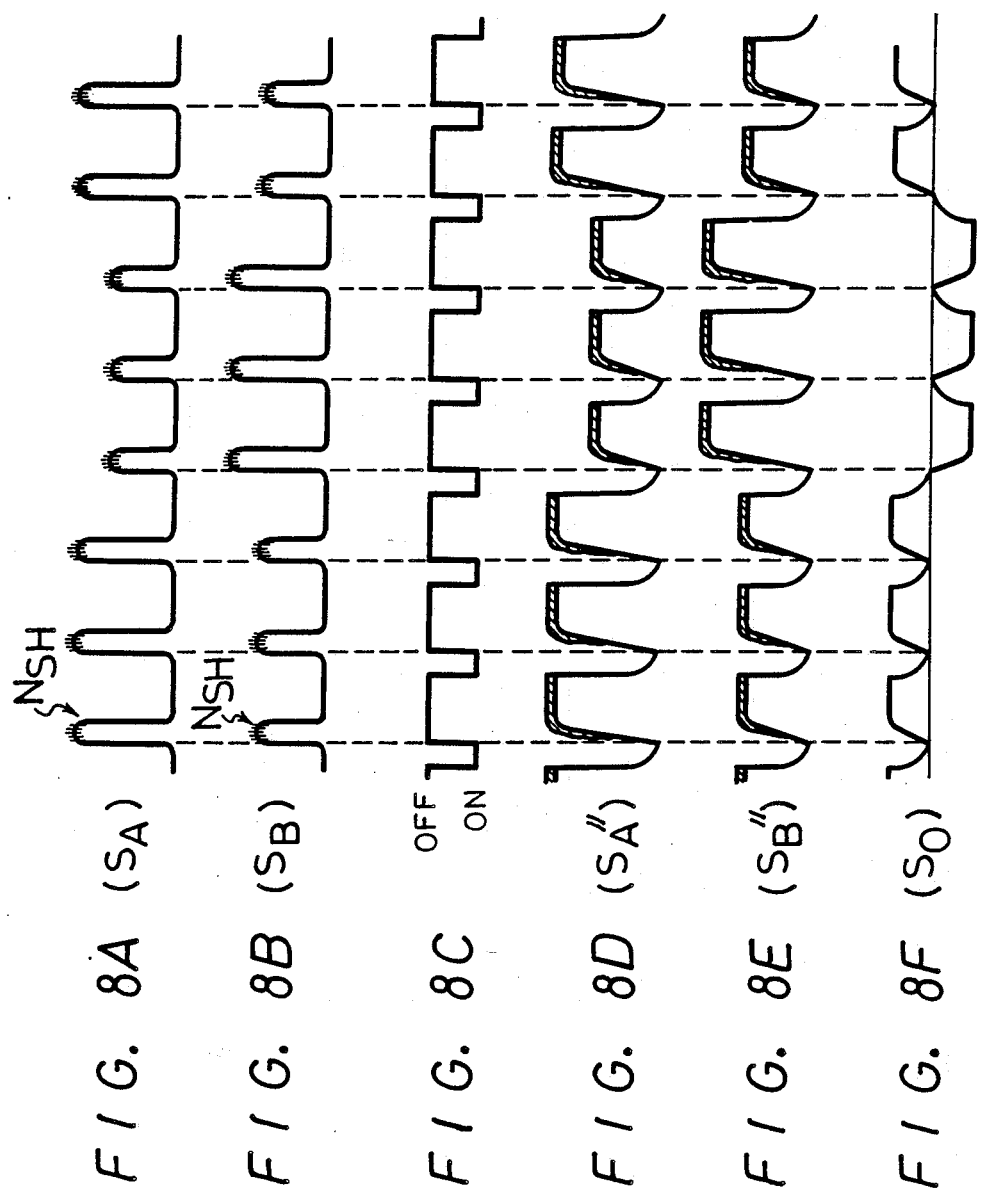

APPARATUS FOR REPRODUCING A MAGNETO-OPTICAL DISK USING A SHOT NOISE REDUCTION CIRCUIT

BACKGROUND OF THE INVENTION

1. Field of the Invention

This invention relates to an apparatus for reproducing a magneto-optical disk, and more particularly to a magneto-optical disk reproducing apparatus which is adapted to reproduce data from a magneto-optical disk having a recording medium which permits optical recording and erasure of data.

2. Description of the Prior Art

There have recently been proposed a variety of apparatus for recording and/or reproducing a magneto-optical disk which allows data to be rewritten thereon, for example, as disclosed in Laid-open Japanese Patent Application No. 56-19176.

FIG. 1 shows an example of an optical system of the prior art for recording data on and reproducing the same from a magneto-optical disk.

In FIG. 1, reference numeral 1 designates a magneto-optical disk formed of a disk substrate 2 made of glass or synthetic resin such as polycarbonate or the like on which a perpendicular magnetization layer 3 is deposited.

Reference numeral 4 designates a magnet arranged in face of the perpendicular magnetization layer 3 of the disk 1. The magnet 4 is used to record data on the disk 1 and erase data recorded on the same.

When the data recorded on the disk 1 is to be erased, the magnet 4 is rotated to face e.g. the N pole thereof with the surface of the disk 1, and under this condition, the disk 1 is irradiated with an erasing laser light emitted from a semiconductor laser device 5 through a collimating lens 6, polarizer 7, beam splitter 8 and an objective lens 9, whereby the magnetizing direction of the perpendicular magnetization layer 3 is oriented in one direction to erase the data.

For recording data on the disk 1, the magnet 4 is rotated to face e.g. the S pole thereof with the surface of the disk 1 in response to an information signal to be recorded, and the laser device 5 emits a recording laser light corresponding to the data to be recorded with which the disk 1 is irradiated through the collimating lens 6, the polarizer 7, the beam splitter 8 and the objective lens 9. By the above-mentioned operations, the magnetizing direction of the perpendicular magnetization layer 3 of the disk 1 is inverted only when the disk 1 is irradiated with the laser light to thereby effect the data recording.

Incidentally, the example of FIG. 1 needs a mechanism for rotating the magnet 4. It is possible to replace the magnet 4 with a coil which inverts the polarity of its magnetic field in response to information signals, wherein the polarity of the magnetic field can be inverted only by supplying the opposite-phase current to the coil, with the result that the mechanism can be simplified.

For reproducing the data thus recorded on the disk 1, the disk 1 is irradiated with the reproducing laser light from the laser device 5 through the collimating lens 6, the polarizer 7, the beam splitter 8 and the objective lens 9 in a manner that the laser light is focused on the perpendicular magnetization layer 3. The laser light beam reflected from the disk 1 is supplied through the objective lens 9 to the beam splitter 8 which reflects the laser light beam in the perpendicular direction to the incident laser light beam so as to supply the same to a polarized beam splitter 12 through a half wave ($\mu/2$) plate 10 and a condenser lens 11. A polarized light component of a first polarization plane (for example, the same as that of the laser light irradiated on the disk 1) of the light beam which passes through the polarized beam splitter 12 is incident on a photo-diode 13A whose output $S_A$ is supplied through an amplifier 14A to a differential amplifier 15 at one of its input terminals. A polarized light component of a second polarization plane, perpendicular to the first polarization plane of the laser beam is incident on a photo-diode 13B whose output $S_B$ is supplied through an amplifer 14B to the differential amplifier 15 at the other input terminal thereof.

The light beam reflected on the disk 1 is such that its polarization plane is rotated by the magnetic Kerr effect, dependent on the magnetizing direction of the perpendicular magnetization layer 3. For example, when the magnetizing direction of the perpendicular magnetization layer 3 is oriented to a first direction, the polarization plane of the reflected light beam is rotated by $\theta_k$. On the other hand, when the magnetizing direction is a second direction opposite to the first direction, the polarization plane is rotated by $-\theta_k$. Therefore, when the magnetizing direction of the perpendicular magnetization layer 3 is in the first direction, the polarized light component of the first polarization plane of the light beam which is led to the photo-diode 13A through the polarized beam splitter 12 is decreased or increased, while the polarized light component of the second polarization plane of the light beam which is led to the photo-diode 13B after being reflected by the polarized beam splitter 12 is increased or decreased. On the other hand, the magnetizing direction of the perpendicular magnetization layer 3 is in the second direction, the opposite states to the above states will occur. Thus, the differential amplifier 15 delivers to an output terminal 16 a signal So corresponding to the data recorded on the disk 1.

With the apparatus as shown in FIG. 1, a carrier to noise (C/N) ratio upon reproduction is substantially proportional to the product of the square root of an amount Io of the light incident on the disk 1 and the rotating angle $\theta_k$, as expressed by the following equation:

$$C/N \propto \sqrt{Io} \times \theta_k \qquad (1)$$

Therefore, it can be thought from the equation (1) to increase the incident light amount Io by elevating the power P of the laser device 5 in order to increase the C/N ratio. However, only increasing the incident light amount Io will result in that the temperature of the perpendicular magnetization layer 3 is locally increased, leading to .. decrease in the rotating angle $\theta_k$ and consequently suppressing the C/N ratio from being increased. Specifically explaining with reference to FIG. 2, when the power P of the laser device 5 is elevated upon reproduction, the C/N ratio is initially increased. However, if the power P becomes above a certain constant value or above 1 mW in the example of FIG. 2, the C/N ratio is decreased to the contrary. This tendency becomes stronger as a linear velocity of the disk upon reproduction is decreased from $V_1$ to $V_2$, $V_3$ . . .

The assignee of the present application has previously proposed an apparatus for reproducing a magneto-optical disk which is capable of increasing the incident light amount Io without increasing the temperature on the perpendicular magnetization layer 3 to thereby increase the C/N ratio (refer to Japanese Patent Application No. 62-3398).

This previously proposed apparatus is adapted to intermittently irradiate the laser light on the disk 1 in a sampling period, that is, the disk 1 is not continuously irradiated with the laser light, whereby the increase in the incident light amount Io does not cause the increase of temperature on the perpendicular magnetization layer 3.

Let it now be assumed that data is being recorded on the disk 1 as shown in FIG. 3A. The laser device 5 is controlled to be intermittently turned on at a sampling period t as shown in FIG. 3B to emit the laser light. The period $t_{ON}$ during which the laser light is emitted is assumed to be 1/5-1/20 the period t.

When the laser light is emitted from the laser device 5, a polarized light, the polarizing plane of which is rotated corresponding to the data recorded on the disk 1, is obtained from the disk 1, so that the output signals $S_A$ and $S_B$ from the respective photo-diodes 13A and 13B are as shown in FIGS. 3C and 3D, and consequently the signal So corresponding to the data, as shown in FIG. 3E is derived at the output terminal 16 from the differential amplifier 15.

As described above, it is possible to largely reduce a mean value of the incident light amount of the laser light by intermittently illuminating the laser light to the disk 1, avoid the increase of temperature on the perpendicular magnetization layer 3, and thereby increase the C/N ratio.

The relationship among the incident light amount Io, carrier C, cophasal (same phase) noise $N_{SA}$ and shot noise $N_{SH}$, thermal noise $N_{TH}$ is as shown in FIG. 4A. To be specific, the carrier C is proportional to the incident light amount Io. The cophasal noise $N_{SA}$, which results from an unbalanced amount of the laser light incident on the photo-diodes 13A and 13B due to the difference in the rotating angle of the polarized plane caused by the λ/2 plate 10 or the like, is proportional to the incident light amount Io. The shot noise $N_{SH}$, which occurs in the procedure of photo-electric conversion in the photo-diodes 13A and 13B, is proportional to the square root of the incident light amount Io.

From the relationships shown in FIG. 4A, the C/N ratio can be illustrated as shown by a solid line in FIG. 4B. However, the C/N ratio expressed by the solid line is obtained without considering decrease in the rotating angle $\theta_k$ due to the elevation of the temperature caused by the increase in the incident light amount Io. A practical C/N ratio is such as shown by a broken line in FIG. 4B. It is therefore possible to make a curve indicative of the practical C/N ratio close to the solid line in FIG. 4B by intermittently irradiating the laser light on the disk 1, as described above.

Since the shot noise $N_{SH}$ is proportional to the square root of the incident light amount Io, as described above, increase in the C/N ratio by increasing the incident light amount Io is merely increased in proportion to the square root of the incident light amount Io also when the disk 1 is intermittently irradiated with the laser light.

However, the shot noise $N_{SH}$ is a random noise so that it cannot be removed by the differential amplifier 15 without any modification.

OBJECTS AND SUMMARY OF THE INVENTION

Accordingly, it is an object of the present invention to provide an apparatus for reproducing a magneto-optical disk which is capable of removing influences of random noise such as the shot noise and so on to thereby improve the C/N ratio.

To achieve the above object, the present invention provides an apparatus for reproducing a magneto-optical disk comprising:

a magneto-optical disk having a magneto-optical recording medium which permits information signals to be optically rewritten;

a laser light source for emitting a light beam to the magneto-optical disk at a predetermined sampling period, detecting means for detecting a polarized component of the light beam emitted from the laser light source and reflected from the magneto-optical disk;

a differential amplifier means for obtaining the difference between the detected outputs from the detecting means; and random noise removing means provided at a rear stage of the detecting means and at preceding stage of the differential amplifier means.

These and other objects, features and advantages of the present invention will become apparent from the following detailed description of the preferred embodiments taken in conjunction with the accompanying drawings, throughout which like reference numerals designate like elements and parts.

BRIEF DESCRIPTION OF THE DRAWINGS

FIGS. 6A to 6E are waveform charts used for explaining operations of the first embodiment shown in FIG. 5;

FIGS. 8A to 8F are waveform charts used for explaining operations of the second embodiment shown in FIG. 7;

DESCRIPTION OF THE PREFERRED EMBODIMENTS

Figure 1:
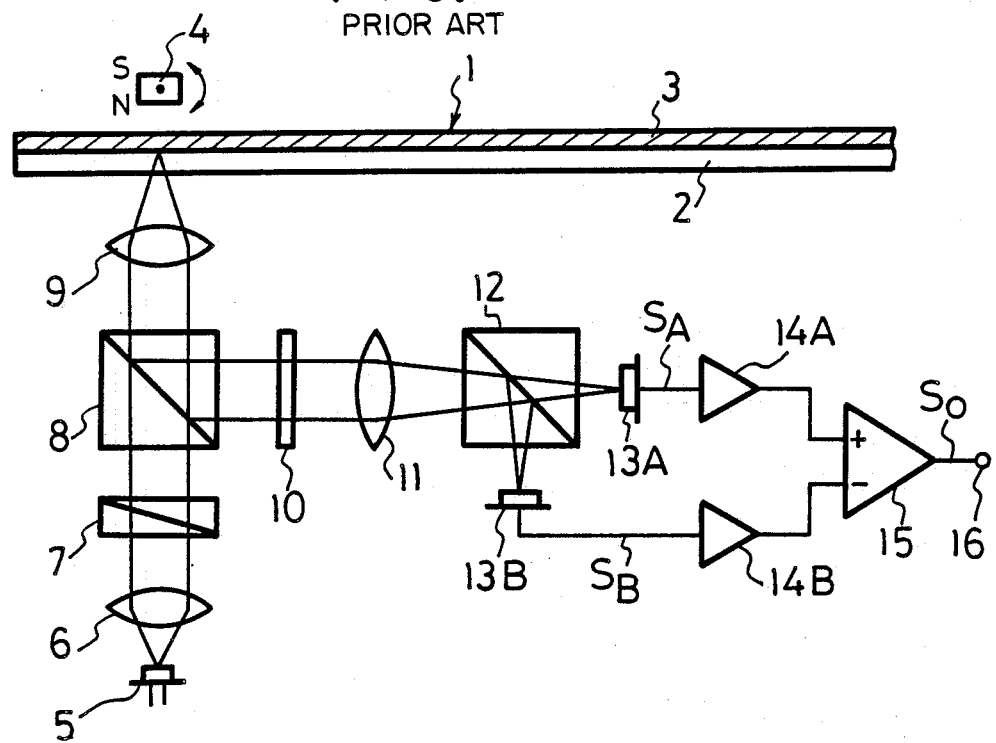
FIG. 1 is a block diagram showing an example of an optical system of a previously proposed apparatus for recording and/or reproducing a magneto-optical disk.
Figure 2:
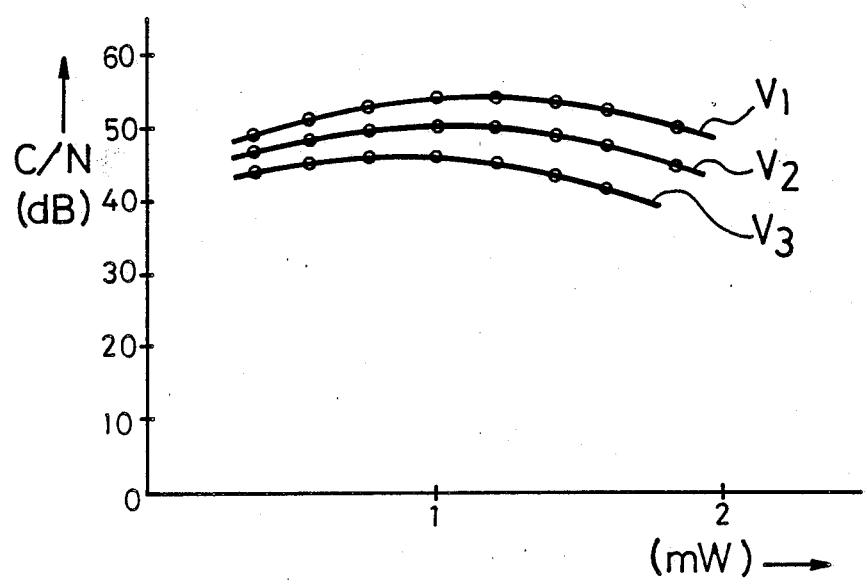
FIG. 2 is a graph showing the relationship between the C/N ratio and the laser power.
Figures 3A, 3B, 3C, 3D, 3E:
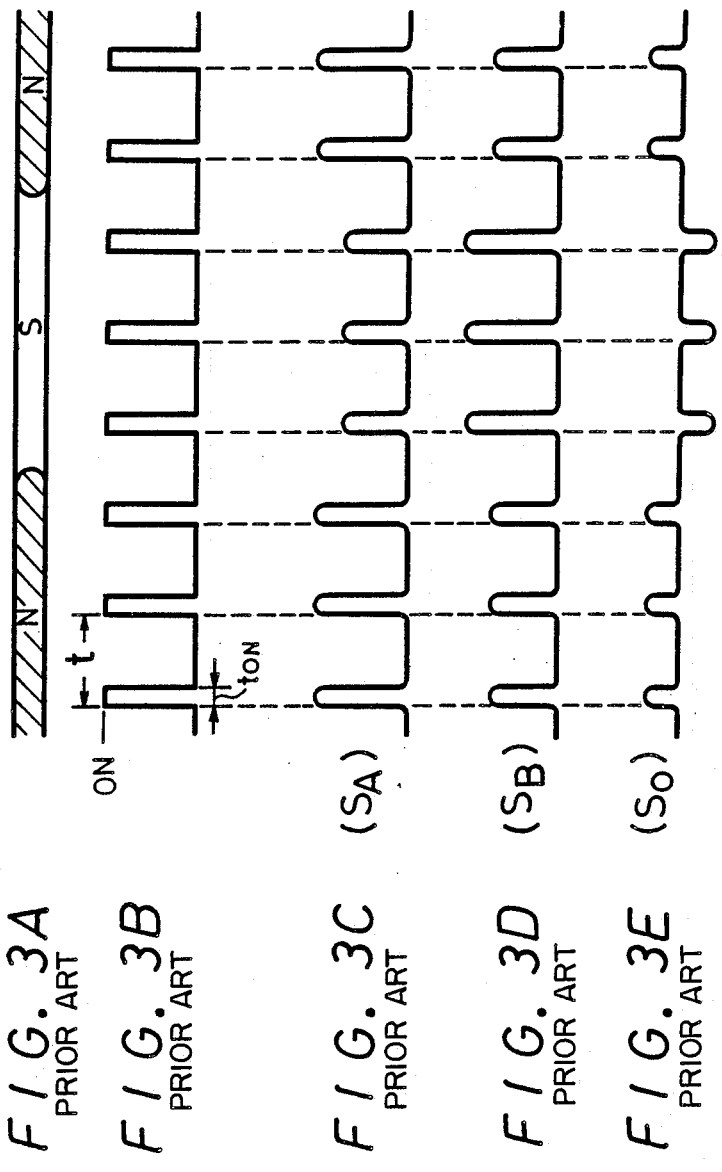
FIGS. 3A to 3E are timing charts used for explaining the intermittent irradiation of the laser light.
Figure 4A:
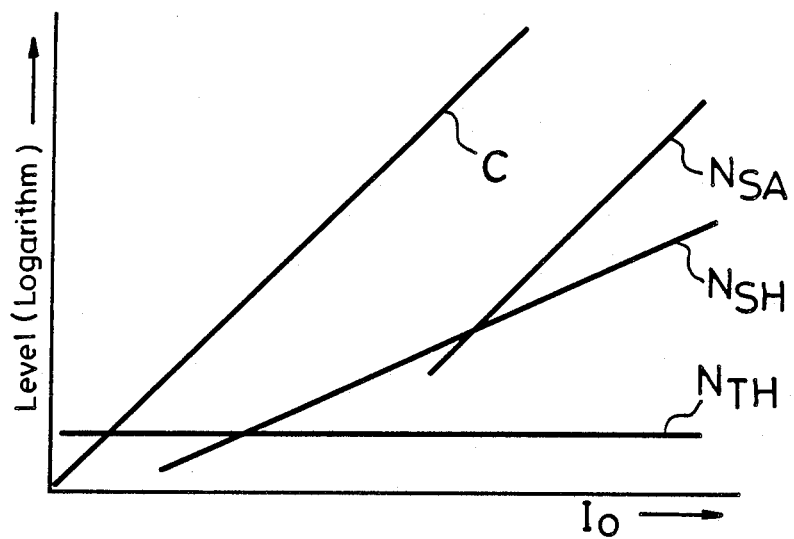
FIG. 4A is a graph showing relationships among the carrier, noises and the incident light amount Io.
Figure 4B:
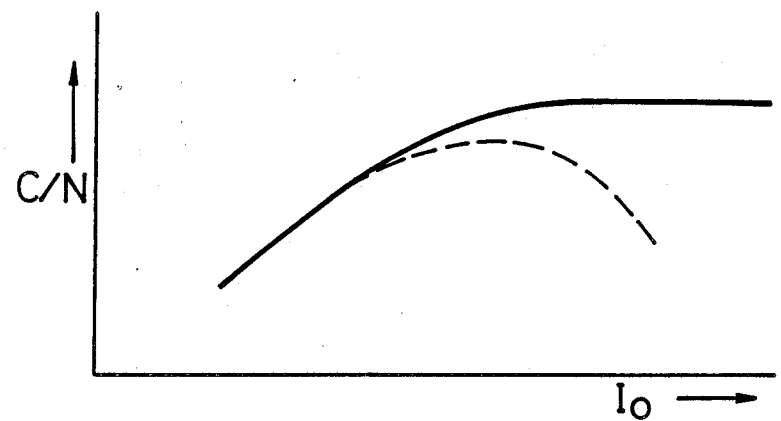
FIG. 4B is a graph showing a relationship between the C/N ratio and the incident light amount Io.

A first embodiment of the present invention will hereinafter be described with reference to FIG. 5 in which the parts corresponding to those of FIG. 1 are designated with the same reference numerals and the detailed explanation thereof will be omitted.

Figure 5:
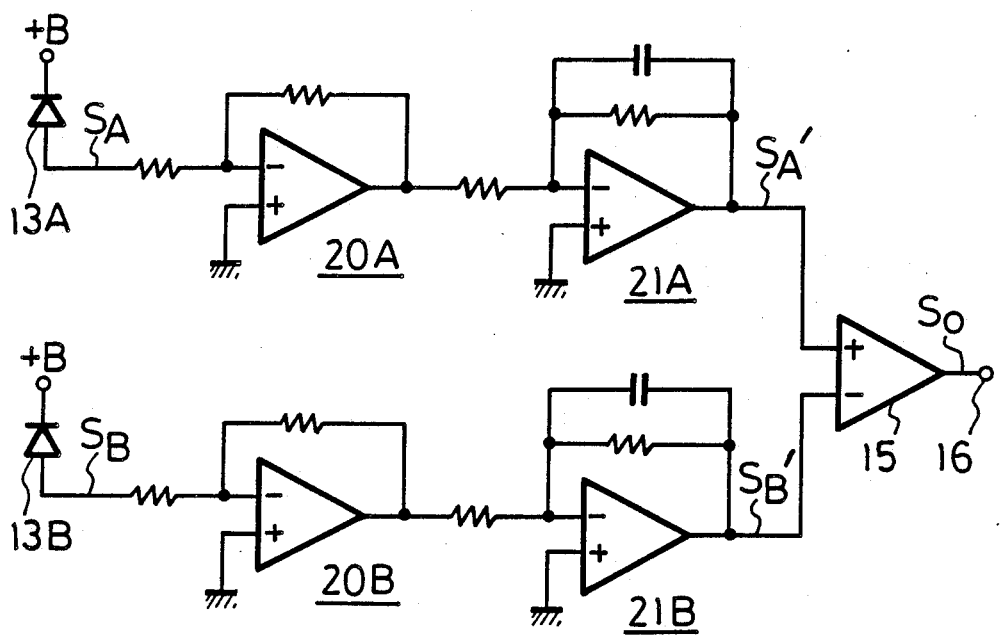
FIG. 5 is a schematic circuit diagram showing a construction of a first embodiment of the present invention.

In FIG. 5, the output signals $S_A$ and $S_B$ from the photo-diodes 13A and 13B are supplied to integrating circuits 21A and 21B each formed of an operational amplifier through current-to-voltage converting circuits 20A and 20B, respectively. The integrating circuits 21A and 21B have their constituting elements selected so as to provide a low pass characteristic such that data reproduced from the disk 1 can pass therethough. For example, if a maximal frequency of data is 7.5 MHz, the cut-off frequency thereof is chosen to be 15 MHz.

The output signals $S_A'$ and $S_B'$ from the integrating circuits 21A and 21B are supplied to the differential amplifier 15 at its input terminals.

The rest of the first embodiment is constructed in the same manner as the prior art example shown in FIG. 1.

In the first embodiment, when the disk 1 is intermittently irradiated with the laser light at the sampling period, the photo-diodes 13A and 13B output the output signals $S_A$ and $S_B$, for example, as shown in FIGS. 6A and 6B, respectively. These output signals $S_A$ and $S_B$ include the random shot noises $N_{SH}$, respectively. At this time, the output signals $S_A'$ and $S_B'$ from the integrating circuits 21A and 21B are as shown in FIGS. 6C and 6D. The hatched portions in FIGS. 6C and 6D indicate DC noises converted from the shot noise $N_{SH}$ which are included similarly in the signals $S_A'$ and $S_B'$, respectively. Thus, the differential amplifier 15 delivers at the output terminal 16 the signal So without the DC noise, as shown in FIG. 6E.

In the first embodiment of the present invention as described above, the shot noise $N_{SH}$ is converted to the DC noise by the integrating circuits 21A and 21B and removed by the differential amplifier 15, so that deterioration of the C/N ratio due to the shot noise $N_{SH}$ is suppressed to thereby largely improve the C/N ratio. Although the shot noise $N_{SH}$ is proportional to the square root of the incident light amount Io, the present embodiment enables the C/N ratio to be improved in proportion to the incident light amount Io by removing the shot noise $N_{SH}$.

Next, a second embodiment of the present invention will be explained with reference to FIG. 7 in which the parts corresponding to those in FIG. 1 are designated with the same reference numerals and the detailed explanation thereof will be omitted.

Figure 7:
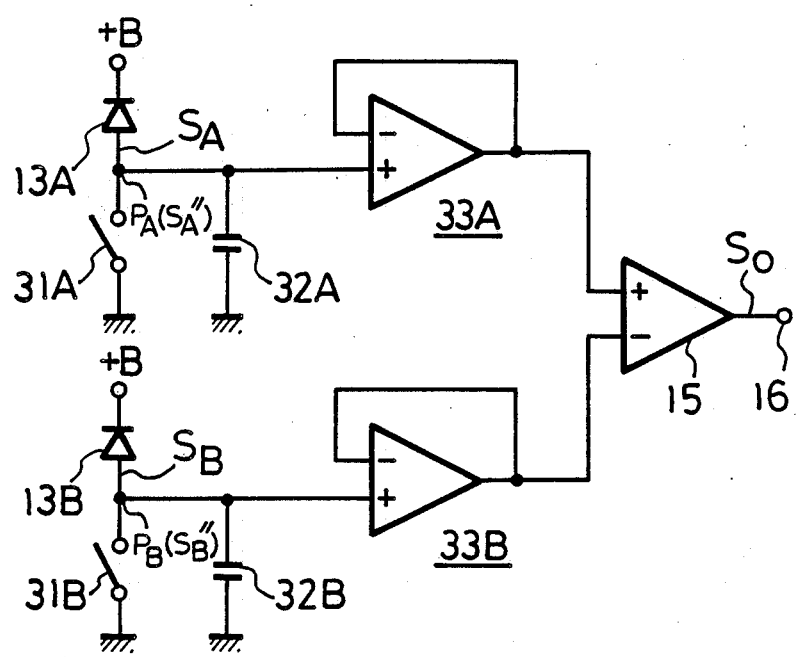
FIG. 7 is a schematic circuit diagram showing a second embodiment of the present invention.

As is illustrated in FIG. 7, the anodes of the respective photo-diodes 13A and 13B are grounded through connecting switches 31A and 31B, respectively.

A connecting point $P_A$ of the photo-diode 13A and the connecting switch 31A is grounded through a capacitor 32A. A signal $S_A''$ derived at the connecting point $P_A$ is supplied through a buffer amplifier 33A to the differential amplifier 15 at one of its input terminals.

Further, a connecting point $P_B$ of the photo-diode 13B and the connecting switch 31B is grounded through a capacitor 32B. A signal $S_B''$ derived at the connecting point $P_B$ is supplied through a buffer amplifier 33B to the differential amplifier 15 at the other input terminal. The rest of the second embodiment is constructed similarly to the prior art example shown in FIG. 1.

In the second embodiment, when the disk 1 is intermittently irradiated with the laser light at the sampling period, the photo-diodes 13A and 13B output the output signals $S_A$ and $S_B$ as shown in FIGS. 8A and 8B, respectively. These output signals $S_A$ and $S_B$ each include the random shot noise $N_{SH}$.

The connecting switches 31A and 31B are on-off controlled at the sampling period with the timing as shown in FIG. 8C. When the connecting switches 31A and 31B are opened, the respective capacitors 32A and 32B are in a charging condition. On the contrary, when the connecting switches 31A and 31B are closed, the respective capacitors 32A and 32B are in a discharging condition.

Therefore, the signals $S_A''$ and $S_B''$ derived at the connecting points $P_A$ and $P_B$ are as shown in FIGS. 8D and 8E, respectively. Hatched portions in FIGS. 8D and 8E indicate the DC noise converted from the shot noise $N_{SH}$ which are respectively included similarly in the signals $S_A''$ and $S_B''$. Thus, the differential amplifier 15 derives to the output terminal 16 the signal So free of the DC noise, as shown in FIG. 8F.

As described above, since the second embodiment is adapted to convert the shot noise to the DC noise and remove the converted DC noise in the same manner as the first embodiment shown in FIG. 5, the same effects as the first embodiment shown in FIG. 5 can be produced.

In the above embodiments, there are provided the two photo-diodes 13A and 13B such that the differential output between the outputs from the photo-diodes 13A and 13B is delivered as the output signal So. However, the C/N ratio can be improved also with a system which is provided with a single photo-diode, instead of two, to directly deliver the output thereof as the output signal So by arranging an integrating means at the rear stage of the photo-diode to convert the shot noise $N_{SH}$ to the DC noise.

Further, although the above-mentioned embodiments have been described for the specific case of removing the shot noise $N_{SH}$, the present invention can be similarly adapted to remove other random noise.

According to the present invention as described above, since the integrating means are provided at the rear stage of the respective detectors to average the random noise such as shot noise (convert it to DC noise) or the like, the random noise can be easily removed, so that the C/N ratio can be largely improved.

The above description is given on preferred embodiments of the invention but it will be apparent that many modifications and variations could be effected by one skilled in the art without departing from the spirit or scope of the novel concepts of the invention so that the scope of the invention should be determined by the appended claims only.

We claim as our invention:

1. An apparatus for reproducing a magneto-optical disk comprising:
   a magneto-optical disk having a magneto-optical recording medium which permits information signals to be optically rewritten;
   a laser light source for emitting a light beam to said magneto-optical disk at a predetermined sampling period;
   detecting means for detecting polarized components of said light beam emitted from said laser light source and reflected from said magneto-optical disk, and providing respective detected outputs;
   a differential amplifier means for obtaining the difference between the respective detected outputs from said detecting means; and
   first and second random noise conversion means each receiving one of said detected outputs provided at a rear stage of said detecting means and connected at a preceding stage of said differential amplifier means for converting random noise in each of said respective detected outputs into respective direct current noise combined with said detected outputs and fed to respective inputs of said differential amplifier means, whereby said direct current random noise is cancelled in an output of said differential amplifier.

2. An apparatus for reproducing a magneto-optical disk as claimed in claim 1, wherein said first and second random noise conversion means each converts photoelectric converting noise generated from said detecting means as said random noise into substantially direct current noise.

3. An apparatus for reproducing a magneto-optical disk as claimed in claim 1, wherein said first and second random conversion means each comprises an integrating means.

4. An apparatus for reproducing a magneto-optical disk as claimed in claim 3, wherein said integrating means is an integrating circuit.

5. An apparatus for reproducing a magneto-optical disk as claimed in claim 3, wherein said integrating means includes a low pass filter.

6. An apparatus for reproducing a magneto-optical disk as claimed in claim 1, wherein said first and second random noise conversion means each comprise switch means connecting an output of said detecting means to ground potential, capacitor means connected in parallel with said switch means, and a buffer amplifier connected to said output of said detecting means and having an output connected to an input of said differential amplifier.

7. An apparatus for reproducing a magneto-optical disk as claimed in claim 6, wherein each of said switch means is on-off controlled in response to said predetermined sampling period of said laser light source.

* * * * *

UNITED STATES PATENT AND TRADEMARK OFFICE
CERTIFICATE OF CORRECTION

PATENT NO.   : 4,964,110
DATED        : October 16, 1990
INVENTOR(S)  : Hideyoshi Horimai, et al.

It is certified that error appears in the above-identified patent and that said Letters Patent is hereby corrected as shown below:

Col. 2, line 58, change "to.." to --to a--

IN THE CLAIMS:

Col. 7, Line 11, after "random" insert --noise--

Signed and Sealed this

Seventh Day of July, 1992

Attest:

DOUGLAS B. COMER

*Attesting Officer*   Acting Commissioner of Patents and Trademarks